United States Patent
Chen et al.

(10) Patent No.: US 9,839,983 B2
(45) Date of Patent: Dec. 12, 2017

(54) MACHINE TOOL OF HIGH-FREQUENCY VIBRATION

(71) Applicant: Tongtai Machine & Tool Co., Ltd., Kaohsiung (TW)

(72) Inventors: Hsin-Pao Chen, Kaohsiung (TW); Chung-Kuang Lin, Kaohsiung (TW); Jian-Tzung Ou, Kaohsiung (TW); Jui-Hsiung Yen, Kaohsiung (TW)

(73) Assignee: Tongtai Machine & Tool Co., Ltd., Kaohsiung (TW)

( * ) Notice: Subject to any disclaimer, the term of this patent is extended or adjusted under 35 U.S.C. 154(b) by 185 days.

(21) Appl. No.: 14/934,433

(22) Filed: Nov. 6, 2015

(65) Prior Publication Data

US 2016/0129542 A1   May 12, 2016

Related U.S. Application Data

(60) Provisional application No. 62/076,792, filed on Nov. 7, 2014.

(51) Int. Cl.
  *B24B 1/00* (2006.01)
  *B24B 1/04* (2006.01)
  (Continued)

(52) U.S. Cl.
  CPC ............... *B24B 1/04* (2013.01); *B06B 3/00* (2013.01); *B23B 31/02* (2013.01); *B23B 37/00* (2013.01);
  (Continued)

(58) Field of Classification Search
  CPC ......... B06B 3/00; B23B 37/00; B23Q 1/0009; B23Q 1/4828; B23Q 5/10;
  (Continued)

(56) References Cited

U.S. PATENT DOCUMENTS 3,614,484 A * 10/1971 Shoh .................... B24B 1/04
                                                 228/1.1
4,616,447 A    10/1986 Haas et al.
(Continued)

FOREIGN PATENT DOCUMENTS

CN        2075993 U      5/1991
CN        102189272 A    9/2011
(Continued)

*Primary Examiner* — Timothy V Eley
(74) *Attorney, Agent, or Firm* — Osha Liang LLP (57) ABSTRACT

A machine tool of high-frequency vibration is provided. A main shaft structure of the machine tool comprises a rotating shaft, the end of which is provided with a tool holder chuck for fixing a tool holder; the upper portion of which is provided with a rotating coil portion; the main shaft structure is correspondingly provided with a stationary coil portion; and the tool holder is provided with a high-frequency vibration module. By non-contact coils, an external electric power/signal can be transmitted into the high-frequency vibration module to avoid a wear phenomenon in a contact-rotating electrode. Because the inductive coil is arranged outside of the tool holder, the manufacturing cost of the tool holder is reduced, and the convenience of changing the tool holder is increased. Moreover, the machining stability and efficiency of the tool holder are improved by a control method of sensing/feedback signals with wireless transmission.

7 Claims, 6 Drawing Sheets (51) Int. Cl.

| | | |
|---|---|---|
| *B24B 49/14* | (2006.01) | |
| *B24B 51/00* | (2006.01) | |
| *B24B 49/10* | (2006.01) | |
| *B23B 37/00* | (2006.01) | |
| *B23Q 1/00* | (2006.01) | |
| *B23Q 1/48* | (2006.01) | |
| *B23Q 5/10* | (2006.01) | |
| *B06B 3/00* | (2006.01) | |
| *B23B 31/02* | (2006.01) | |

(52) U.S. Cl.
CPC ......... *B23Q 1/0009* (2013.01); *B23Q 1/4828* (2013.01); *B23Q 5/10* (2013.01); *B24B 49/10* (2013.01); *B24B 49/14* (2013.01); *B24B 51/00* (2013.01); *B23B 2260/108* (2013.01); *B23Q 2230/004* (2013.01)

(58) Field of Classification Search
CPC ..... B23Q 2230/004; B24B 1/04; B24B 49/10; B24B 49/14; B24B 51/00
See application file for complete search history.

(56) References Cited

U.S. PATENT DOCUMENTS

| | | | | |
|---|---|---|---|---|
| 4,828,052 A | * | 5/1989 | Duran | B24B 1/04 |
| | | | | 175/55 |
| 4,838,853 A | * | 6/1989 | Parisi | A61B 17/32001 |
| | | | | 601/2 |
| 4,934,103 A | * | 6/1990 | Campergue | B24B 1/04 |
| | | | | 451/165 |
| 5,144,771 A | * | 9/1992 | Miwa | B06B 3/02 |
| | | | | 451/165 |
| 5,305,556 A | * | 4/1994 | Kopp | B06B 3/00 |
| | | | | 451/124 |
| 5,361,543 A | * | 11/1994 | Bory | B06B 3/02 |
| | | | | 451/155 |
| 5,440,190 A | * | 8/1995 | Imabayashi | H02N 2/0015 |
| | | | | 310/323.13 |
| 5,733,074 A | * | 3/1998 | Stock | B23B 37/00 |
| | | | | 408/129 |
| 6,204,592 B1 | * | 3/2001 | Hur | A61B 17/1624 |
| | | | | 310/323.12 |
| 6,234,728 B1 | * | 5/2001 | Brun-Picard | B23B 29/125 |
| | | | | 408/17 |
| 7,328,519 B2 | | 2/2008 | Harding et al. | |
| 7,824,247 B1 | * | 11/2010 | Bar-Cohen | B23B 37/00 |
| | | | | 125/28 |
| 8,080,918 B2 | | 12/2011 | Tzschentke et al. | |
| 8,905,689 B2 | * | 12/2014 | Short | B23B 29/125 |
| | | | | 279/103 |
| 8,926,235 B2 | | 1/2015 | Moraru et al. | |
| 9,498,827 B2 | | 11/2016 | Otter et al. | |
| 9,707,655 B2 | * | 7/2017 | Hessenkamper | B23B 29/125 |
| 2011/0170964 A1 | * | 7/2011 | Rabate | B23B 29/125 |
| | | | | 408/17 |
| 2014/0102268 A1 | * | 4/2014 | Hariki | B23B 29/125 |
| | | | | 82/118 |
| 2015/0352713 A1 | | 12/2015 | Takazakura et al. | |
| 2016/0184941 A1 | * | 6/2016 | Kao | B23Q 1/0009 |
| | | | | 307/104 |

FOREIGN PATENT DOCUMENTS

| | | |
|---|---|---|
| CN | 202356740 U | 8/2012 |
| DE | 8305485 U1 | 5/1985 |
| EP | 1684938 A1 | 8/2006 |
| EP | 2735400 A1 | 5/2014 |
| JP | 2002219606 A | 8/2002 |
| JP | 2008149441 A | 7/2008 |
| JP | 2012525265 A | 10/2012 |
| TW | M449656 U | 4/2013 |
| TW | M461810 U | 9/2013 |
| TW | 201413409 A | 4/2014 |
| WO | 2007088197 A1 | 8/2007 |
| WO | 2008156116 A1 | 12/2008 |
| WO | 2014111973 A1 | 7/2014 |

\* cited by examiner

MACHINE TOOL OF HIGH-FREQUENCY VIBRATION

CROSS REFERENCE TO RELATED APPLICATIONS

This application claims priority benefit from U.S. Provisional Application No. 62/076,792, filed on Nov. 7, 2014, and the contents of which are incorporated herein by reference.

FIELD OF THE INVENTION

The present invention relates to a machine tool of high-frequency vibration, and more particularly to a machine tool and a control method of sensing/feedback signals thereof which installs an inductive coil in a main shaft and transmits electric power/signal into a high-frequency vibration tool holder by contact type electrodes.

BACKGROUND OF THE INVENTION

High-frequency vibration cutting is a new type machining technology, and by adding a high-frequency vibration into a common cutting tool, an interrupted contact is generated between a cutting tool and a workpiece, and it fundamentally changes the conventional cutting method. This change can solve the problems existing in the conventional cutting technologies, for example the vibration and the heat accumulation during a cutting process or the unstable machining quality, so that the cutting effect is improved.

In a conventional high-frequency vibration technology, a high-frequency vibration device is disposed inside a tool holder, which is removably mounted on a machining center. Generally, the machining center having high-frequency vibration has two methods to supply electric power, a contact type and a non-contact type. Because electrodes of the contact type are more easily worn out, the non-contact type electricity supply is more frequently adopted in the new type of high-frequency vibration machining center.

In the conventional technology of a non-contact type electricity supply, inductive coils are adopted, wherein a stationary coil is disposed in a machining center, and a rotating coil is disposed inside a tool holder, so that it can avoid an electrode wear phenomenon of a contact type rotating electrodes. However, since the inductive coils are installed inside the tool holder, the manufacturing cost of the tool holder is increased and the convenience of changing the tool holder is decreased.

Hence, it is necessary to provide an improved machine tool of high-frequency vibration and a control method of sensing/feedback signals thereof to solve the problems existing in the conventional technologies.

SUMMARY OF THE INVENTION

The object of the present invention is to provide a machine tool of high-frequency vibration, which installs an inductive coil in a main shaft and transmit electric power/signal into a high-frequency vibration tool holder by contact type electrodes. Therefore, it can avoid a wear phenomenon in a contact-rotating electrode, such as a slip ring. Additionally, because the inductive coil is arranged outside the tool holder, the manufacturing cost of the tool holder is reduced and the convenience of changing the tool holder is increased.

For achieving above-mentioned object, the present invention provides a machine tool of high-frequency vibration, which comprises a main shaft structure and a high-frequency vibration tool holder, wherein the main shaft structure includes:

a main body fixed on a working side of the machine tool;

a rotating shaft rotatably disposed inside of the main body;

a tool holder chuck coaxially disposed under the rotating shaft, wherein the tool holder chuck has a pair of position keys coaxially arranged with each other, and inner side surfaces of the position keys are provided with at least one pair of first electrodes;

a stationary coil portion including a stationary ring and at least one primary coil, which are both hollow shaped and are coaxially stacked and fixed on an upper portion of the rotating shaft, wherein the stationary ring is fixed on the main body, so that the stationary coil portion is fixed relative to the main body; and a pair of external electric wires are electrically connected to the stationary ring; and a rotating coil portion including a rotating ring and at least one secondary coil, which are both hollow shaped and are coaxially stacked and fixed on an upper portion of the rotating shaft, wherein the secondary coil corresponds to the primary coil of the stationary coil portion; the rotating ring is fixed on the rotating shaft, so that the rotating coil portion is rotated with the rotating shaft, and the rotating coil portion is electrically connected to the at least one pair of first electrodes of the inner side surfaces of the position keys by at least one pair of inner electric wires;

wherein the high-frequency vibration tool holder comprises:

a holder shank portion disposed on an upper end of the tool holder, and configured for clamping and fixing with the tool holder chuck of the main shaft structure, wherein the holder shank portion includes a pair of end keyways corresponding to the pair of position keys of the tool holder chuck; and outer sides of the end keyways are provided with at least one pair of second electrodes corresponding and contacting to the at least one pair of first electrodes of the tool holder chuck;

a receiving portion disposed on the middle portion of the tool holder, wherein a high-frequency vibration module is disposed inside the receiving portion, and is electrically connected to the at least one pair of second electrodes; and a tool chuck disposed on the lower portion of the tool holder, and configured for clamping and downwardly fixing a cutting tool;

wherein the machine tool further comprises an automatic machining control module and a high-frequency control module; the automatic machining control module controls and rotates the rotating shaft, so as to cause the cutting tool under the tool holder to rotate so as to process a cutting operation; the high-frequency control module controls an electric power/signal to pass through the at least one pair of external electric wires to the stationary ring of the stationary coil portion, then the electric power/signal is transmitted to the at least one primary coil, and the at least one secondary coil of the rotating coil portion is induced to generate an electric power/signal, then the electric power/signal passes through the rotating ring, and passes through the at least one pair of inner electric wires to be transmitted to the at least one pair of first electrodes of the tool holder chuck, then the electric power/signal is transmitted to the at least one pair of second electrodes of the holder shank portion, and finally the electric power/signal is transmitted to the high-frequency vibration module to provide the cutting tool with a high-frequency vibration.

In one of the embodiments of the present invention, the pair of first electrodes are contact type spring electrodes; and the pair of second electrodes include conducting sheets in an inner ring thereof and insulating sheets in a periphery thereof.

In one of the embodiments of the present invention, the high-frequency vibration module is selected from a group of a piezoelectric actuator, a voice coil actuator, and a magnetic actuator.

In one of the embodiments of the present invention, the number of the primary coils is two and that of the secondary coils is correspondingly two, wherein one set of the primary coil and the secondary coil is configured for transmitting electric power and carrier wave signals, and the other set of the primary coil and the secondary coil is only configured for transmitting carrier wave signals.

In one of the embodiments of the present invention, the machine tool further comprises a wireless signal receiving module and a computer module; and the high-frequency vibration tool holder further comprises a sensing module and a wireless signal transmitting module; the sensing module is configured to transmit at least one sensing data to the wireless signal receiving module by the wireless signal transmitting module, and after the sensing data is analyzed and computed by the computer module, the computer module transmits the analyzed result to be a control command outputting to the automatic machining control module and the high-frequency control module.

In one of the embodiments of the present invention, the sensing module includes a strain gauge, and the sensing data includes an internal stress data of the high-frequency vibration tool holder sensed by the strain gauge.

In one of the embodiments of the present invention, the sensing module includes a thermometer, and the sensing data includes a temperature data of the high-frequency vibration tool holder sensed by the thermometer.

For achieving above-mentioned object, the present invention provides a control method of sensing/feedback signals of a machine tool of high-frequency vibration, which comprises following steps of:

(a) providing a machine tool and a high-frequency vibration tool holder, wherein the machine tool is provided with an automatic machining control module, a high-frequency control module, a wireless signal receiving module, and a computer module; and the high-frequency vibration tool holder is provided with a high-frequency vibration module, a sensing module, and a wireless signal transmitting module;

(b) using the automatic machining control module to control a rotating power and a feed quantity of the high-frequency vibration tool holder of the machine tool to process a work piece; and using the high-frequency control module to control the high-frequency vibration tool holder to generates a high-frequency vibration;

(c) using the sensing module to transmit at least one sensing data to the wireless signal receiving module by the wireless signal transmitting module, and analyzing and computing the sensing data by the computer module;

(d) using the computer module to transmit an analyzed result of the sensing data to be a control command outputting to the automatic machining control module and the high-frequency control module; and (e) using the automatic machining control module to adjust the rotating power and the feed quantity of the high-frequency vibration tool holder, and adjusting the vibration frequency of the high-frequency vibration tool holder by the high-frequency control module.

In one of the embodiments of the present invention, the sensing module includes a strain gauge, and the sensing data includes an internal stress data of the high-frequency vibration tool holder sensed by the strain gauge.

In one of the embodiments of the present invention, the sensing module includes a thermometer, and the sensing data includes a temperature data of the high-frequency vibration tool holder sensed by the thermometer.

As described above, by using the machine tool of high-frequency vibration and the control method of sensing/feedback signals thereof, it not only can lower the manufacturing cost of the tool holder and increase the convenience of changing the tool holder, but can also improve the machining stability and efficiency of the high-frequency vibration tool holder.

DETAILED DESCRIPTION OF THE PREFERRED EMBODIMENTS

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto. In the drawings, units with similar structures use the same numerals.

A machine tool of the present invention can be a machine tool which needs a function of high-frequency vibration, and the structure and the principle of the machine tool with the function of high-frequency vibration is described below.

Figure 1:
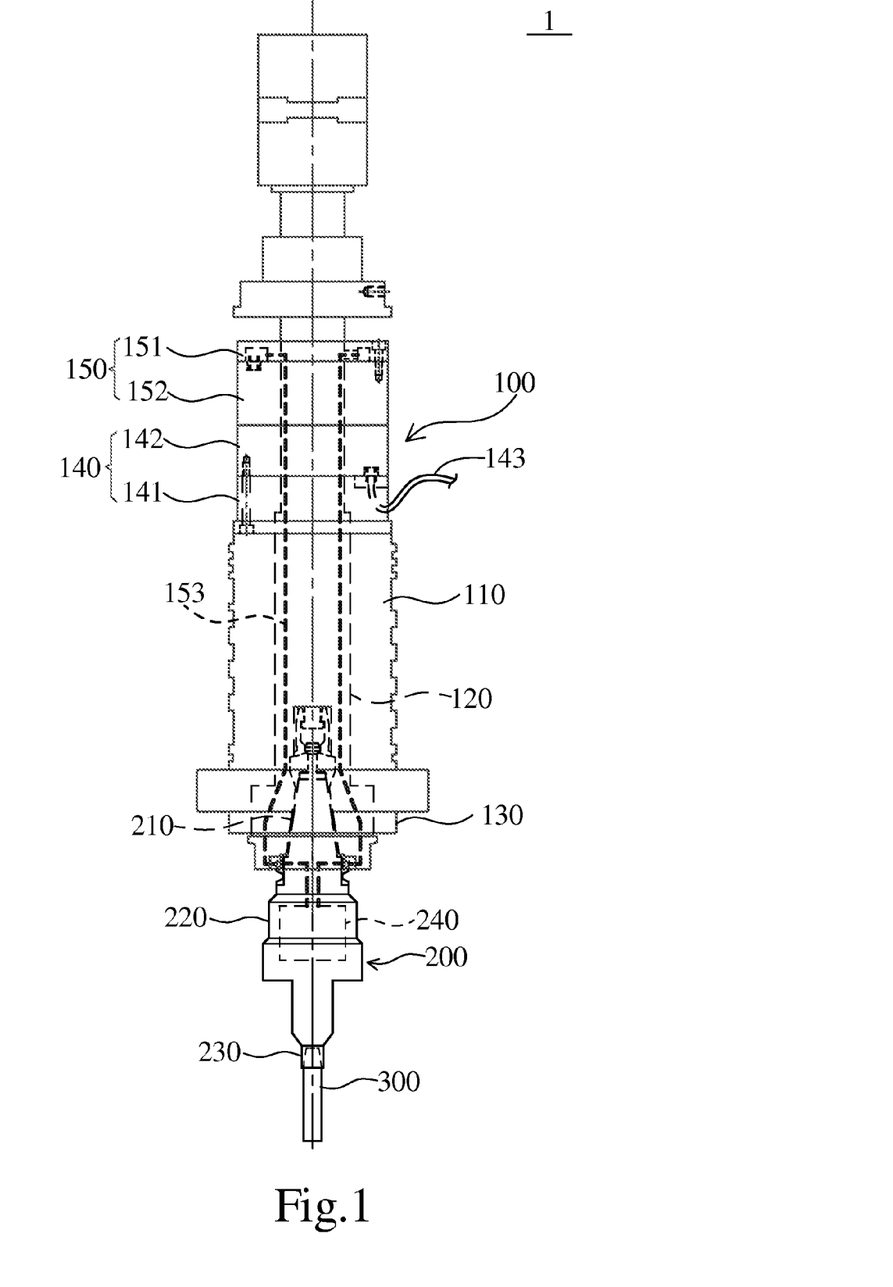
FIG. 1 is an assembling schematic view of a machine tool of high-frequency vibration according to a preferred embodiment of the present invention.
Figure 2:
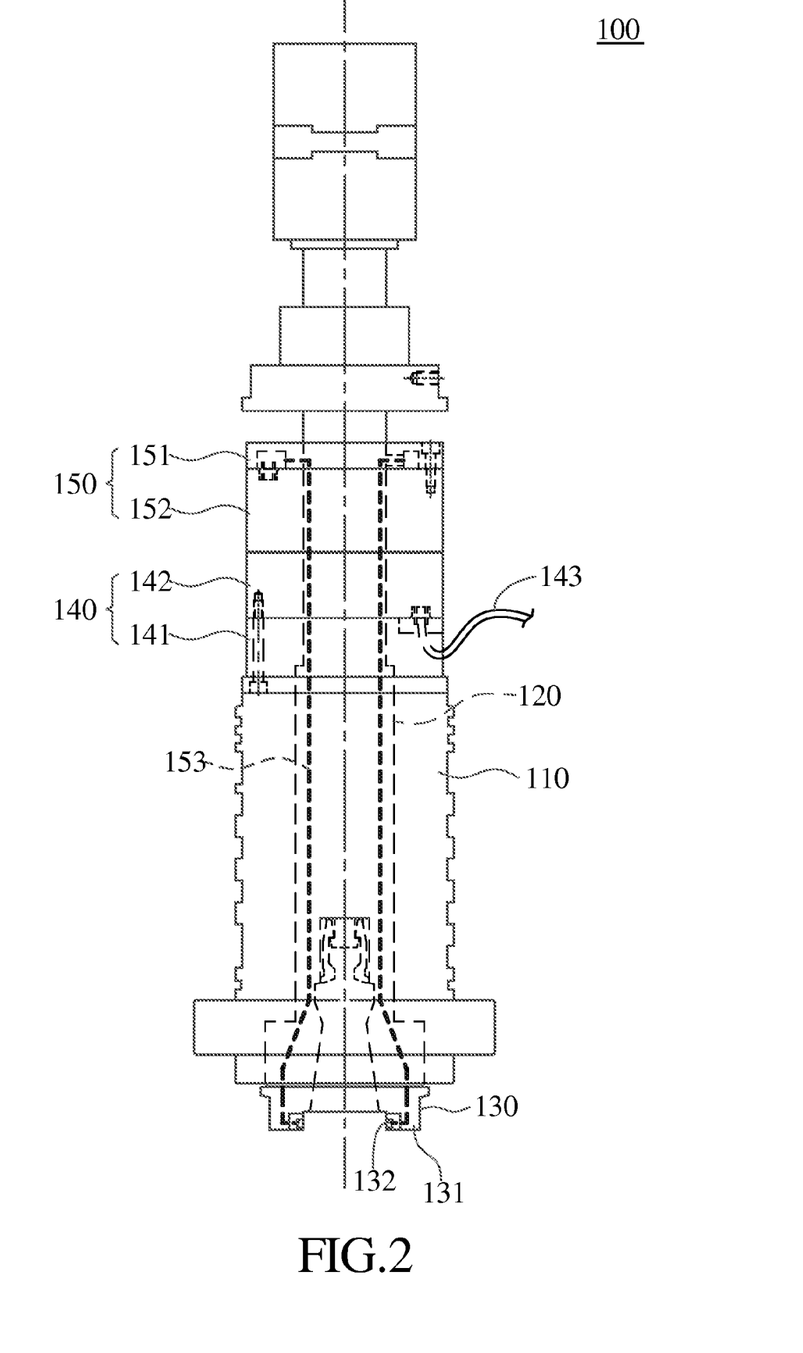
FIG. 2 is a structural schematic view of a main shaft structure of the machine tool according to a preferred embodiment of the present invention.
Figure 3:
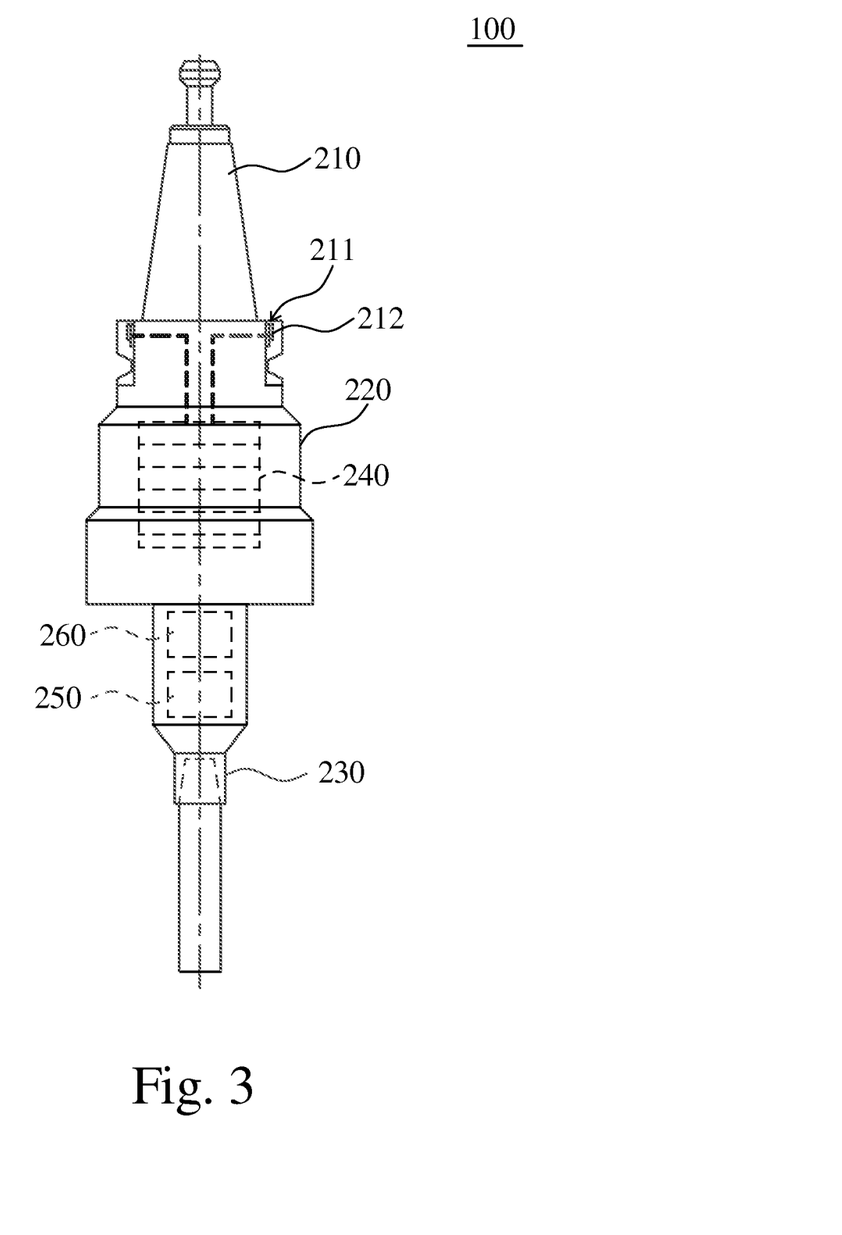
FIG. 3 is a schematic view of a high-frequency vibration tool holder according to a preferred embodiment of the present invention.

Refer now to FIGS. 1 to 3, FIG. 1 is an assembling schematic view of a machine tool of high-frequency vibration according to a preferred embodiment of the present invention; FIG. 2 is a structural schematic view of a main shaft structure of the machine tool according to a preferred embodiment of the present invention; and FIG. 3 is a schematic view of a high-frequency vibration tool holder according to a preferred embodiment of the present invention. A machine tool 1 with high-frequency vibration according to the present invention comprises: a main shaft structure 100 and a high-frequency vibration tool holder 200. The main shaft structure 100 includes a main body 110, a rotating shaft 120, and a tool holder chuck 130. The main body 110 is fixed on a working side of the machine tool 1; the rotating shaft 120 is rotatably disposed inside of the main body 110; and the tool holder chuck 130 is coaxially disposed under the rotating shaft 120, wherein the tool holder chuck 130 has a pair of position keys 131, and inner side surfaces of the position keys 131 are provided with at least one pair of first electrodes 132.

Furthermore, the main shaft structure 100 further comprises a stationary coil portion 140 and a rotating coil portion 150. The stationary coil portion 140 includes a stationary ring 141 and at least one primary coil 142, which are both hollow shaped and are coaxially stacked and fixed on an upper portion of the rotating shaft 120. The stationary ring 141 is fixed on the main body 110, so that the stationary coil portion 140 is fixed relative to the main body 110, and a pair of external electric wires 143 is electrically connected to the stationary ring 141. Additionally, the rotating coil portion 150 includes a rotating ring 151 and at least one secondary coil 152, which are both hollow shaped and are coaxially stacked and fixed on an upper portion of the rotating shaft 120. The secondary coil 152 corresponds to the primary coil 142 of the stationary coil portion 140. The rotating ring 151 is fixed on the rotating shaft 120, so that the rotating coil portion 150 is able to be rotated with the rotating shaft 120, and the rotating coil portion 150 is electrically connected to the at least one pair of first electrodes 132 of the inner side surfaces of the position keys 131 by at least one pair of inner electric wires 153.

As shown in FIGS. 1 to 3, the high-frequency vibration tool holder 200 comprises a holder shank portion 210, a receiving portion 220, and a tool chuck 230. The holder shank portion 210 is disposed on an upper end of the tool holder 200, and is configured for clamping and fixing with the tool holder chuck 130 of the main shaft structure 100. The holder shank portion 210 includes a pair of end keyways 211 corresponding to the pair of position keys 131 of the tool holder chuck 130. Outer sides of the end keyways 211 are provided with at least one pair of second electrodes 212 corresponding and contacting to the at least one pair of first electrodes 132 of the tool holder chuck 130. The receiving portion 220 is disposed on the middle portion of the tool holder 200. A high-frequency vibration module 240 is disposed inside the receiving portion 220, and is electrically connected to the at least one pair of second electrodes 212. Additionally, the tool chuck 230 is disposed on the lower portion of the tool holder 200, and is configured for clamping and downwardly fixing a cutting tool 300.

Figure 4:
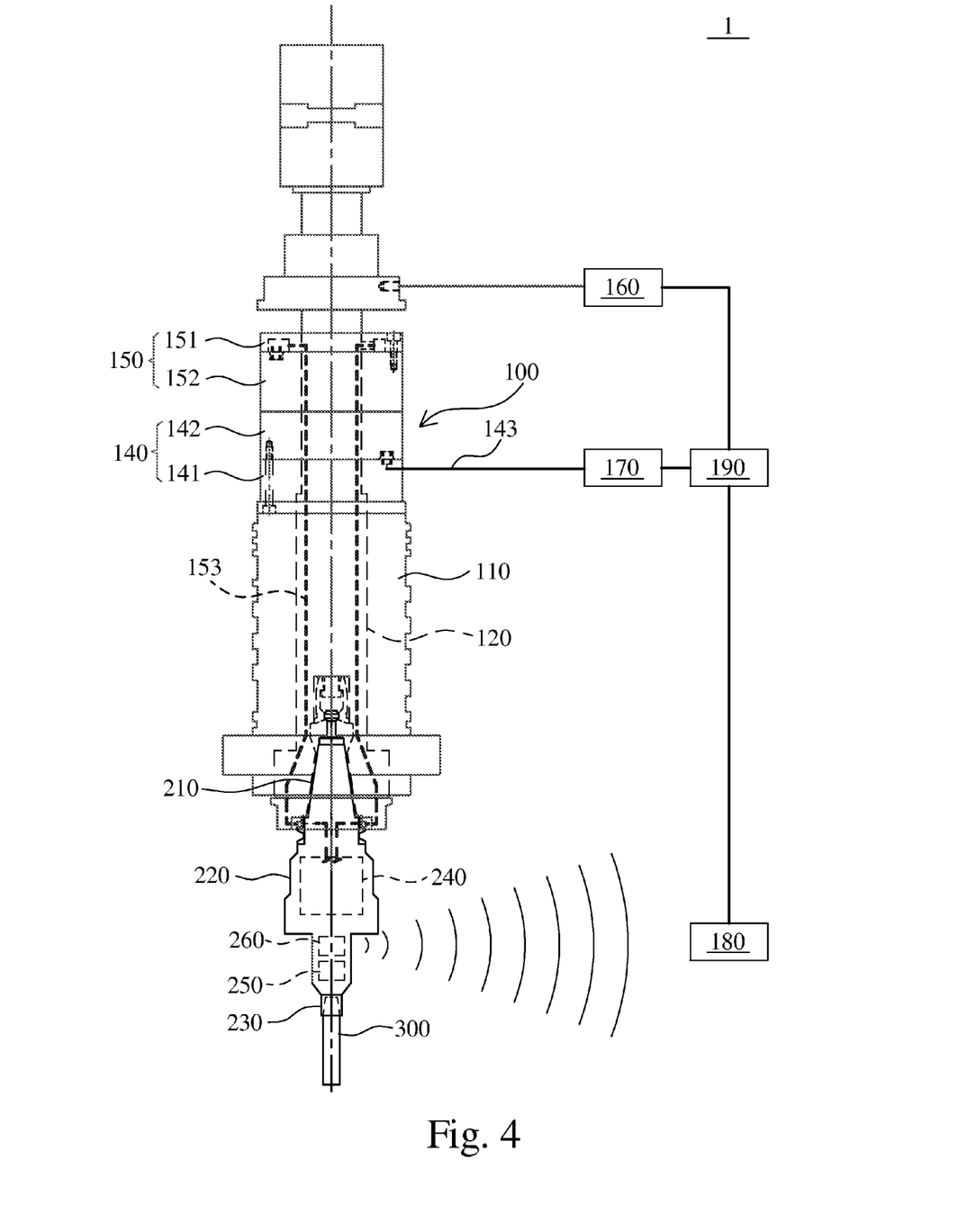
FIG. 4 is a schematic view of a control method of the machine tool of high-frequency vibration according to a preferred embodiment of the present invention.

Refer now to FIG. 4, which is a schematic view of a control method of the machine tool of high-frequency vibration according to a preferred embodiment of the present invention. The machine tool 1 further comprises an automatic machining control module 160 and a high-frequency control module 170. The automatic machining control module 160 controls and rotates the rotating shaft 120, so as to cause the cutting tool 300 under the tool holder 200 to rotate so as to process a cutting operation. The high-frequency control module 170 controls an electric power/signal to pass through the at least one pair of external electric wires 143 to the stationary ring 141 of the stationary coil portion 140, then the electric power/signal is transmitted to the at least one primary coil 142, and the at least one secondary coil 152 of the rotating coil portion 150 is induced to generate an electric power/signal, then the electric power/signal passes through the rotating ring 151, and then passes through the at least one pair of inner electric wires 153 to be transmitted to the at least one pair of first electrodes 132 of the tool holder chuck 130, then the electric power/signal is transmitted to the at least one pair of second electrodes 212 of the holder shank portion 210, and finally the electric power/signal is transmitted to the high-frequency vibration module 240 to provide the cutting tool 300 with a high-frequency vibration.

As described above, in the present invention, because the rotating ring 151 is disposed on the rotating shaft 120, and the electric power/signal is transmitted into the high-frequency vibration tool holder 200 by the contact type first electrodes 132 and second electrodes 212, so that it can avoid an electrode wear phenomenon of a contact type rotating electrodes, and because the rotating ring 151 is disposed outside of the tool holder 200, the manufacturing cost of the tool holder is reduced and the convenience of changing the tool holder is increased.

Furthermore, preferably, the pair of first electrodes 132 can be contact type spring electrodes, and the pair of second electrodes 212 includes conducting sheets in the inner ground and insulating sheets in the periphery thereof.

Preferably, the pair of the first electrodes 132 includes a positive electrode and a negative electrode, and the pair of the second electrodes 212 correspondingly includes a positive electrode and a negative electrode.

Preferably, the high-frequency vibration module 240 can be selected from a group of a piezoelectric actuator, a voice coil actuator, and a magnetic actuator.

In another possible embodiment of the present invention, the number of the primary coils 142 is two (or more than two) and that of the secondary coils 152 is correspondingly two (or more than two), wherein one set of the primary coil 142 and the secondary coil 152 are configured for transmitting electric power and carrier wave signals, and the other set of the primary coil 142 and the secondary coil 152 are only configured for transmitting carrier wave signals.

Refer now to FIG. 4 again. FIG. 4 shows a control method of sensing/feedback signals of the above-mentioned machine tool of high-frequency vibration:

Firstly, providing a machine tool 1 and a high-frequency vibration tool holder 200, wherein the machine tool 1 is provided with an automatic machining control module 160, a high-frequency control module 170, a wireless signal receiving module 180 and a computer module 190; and the high-frequency vibration tool holder 200 is provided with a high-frequency vibration module 240, a sensing module 250, and a wireless signal transmitting module 260.

Next, the automatic machining control module 160 controls a rotating power and a feed quantity of the high-frequency vibration tool holder 200 of the machine tool 1 to process a work piece; and the high-frequency control module 170 controls the high-frequency vibration tool holder 200 to generates a high-frequency vibration.

Next, the sensing module 250 transmits at least one sensing data to the wireless signal receiving module 180 by the wireless signal transmitting module 260, and the sensing data is analyzed and computed by the computer module 190.

Next, the computer module 190 transmits an analyzed result of the sensing data to be a control command outputting to the automatic machining control module 160 and/or the high-frequency control module 170.

Finally, the automatic machining control module 160 adjusts the rotating power and the feed quantity of the high-frequency vibration tool holder 200, and the high-frequency control module 170 adjusts the vibration frequency of the high-frequency vibration tool holder 200, so that the machining stability and efficiency of the high-frequency vibration tool holder 200 is improved.

As described above, the machine tool of high-frequency vibration of the present invention further comprises a wireless signal receiving module 180 and a computer module 190; and the high-frequency vibration tool holder 200 further comprises a sensing module 250 and a wireless signal transmitting module 260. Therefore, the sensing module 250 is configured to transmit at least one sensing data to the wireless signal receiving module 180 by the wireless signal transmitting module 260, and after the sensing data is analyzed and computed by the computer module 190, the computer module 190 transmits the analyzed result to be a control command outputting to the automatic machining control module 160 and the high-frequency control module 170, so as to improve the machining stability and efficiency of the high-frequency vibration tool holder 200.

Furthermore, preferably, the sensing module 250 can include a strain gauge, and the sensing data includes an internal stress data of the high-frequency vibration tool holder 200 sensed by the strain gauge.

Preferably, the sensing module 250 can include a thermometer, and the sensing data includes a temperature data of the high-frequency vibration tool holder 200 sensed by the thermometer.

Preferably, the sensing data can be increased by a signal amplifier (not shown).

Selectively, the high-frequency vibration tool holder 200 can also use the above-mentioned non-contact type electric power/signal transmitting method to transmit the data of the high-frequency vibration into the computer module 190, so as to control the high-frequency control module 170 adjusting the vibration frequency of the high-frequency vibration module 240. Since this is a known technology, which may possibly be used in the present invention, it is not descripted herein.

In the present invention, by the control method of sensing/feedback signals with wireless transmission, the sensed data, such as the frequency of the high-frequency vibration, the internal stress of the tool holder 200 and/or the temperature of the tool holder 200, is transmitted into the computer module 190 for combination analysis, so as to control the automatic machining control module 160 and/or the high-frequency control module 170.

Figure 5A:
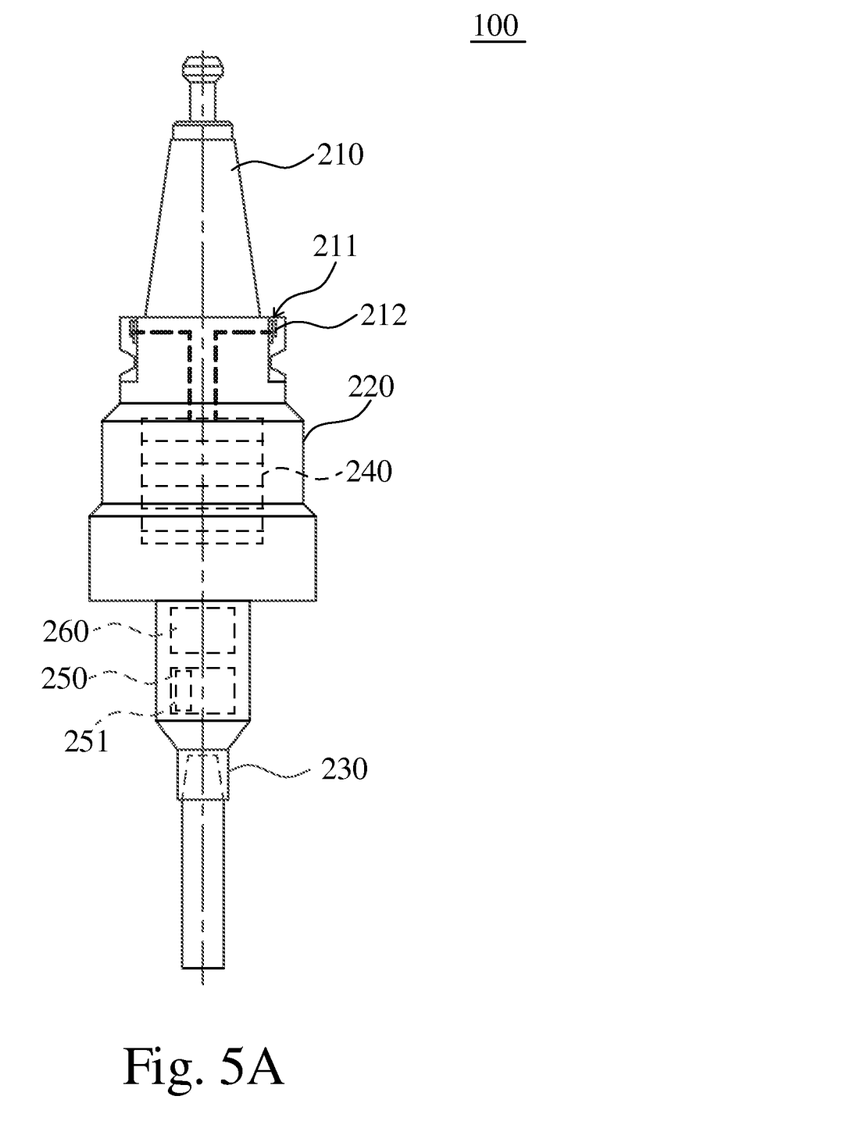
FIG. 5A is a schematic view of a strain gauge of a sensing module according to a preferred embodiment of the present invention.

As shown in FIG. 5A, the sensing module 250 can include at least one strain gauge 251, which is installed in any direction inside of the high-frequency vibration tool holder 200, and is used to sense a variation of the internal stress, namely manufacturing loading, of the tool holder 200 in the direction in which the strain gauge 251 is installed. That is, by the sensed data, the computer module 190 can analyze a change of the manufacturing loading of the tool holder 200 in the direction.

Figure 5B:
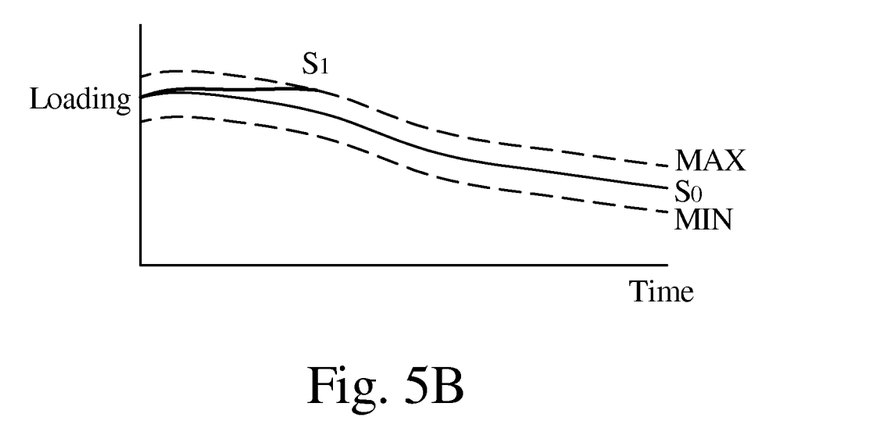
FIG. 5B is a machining loading curve chart of the strain gauge of the sensing module according to a preferred embodiment of the present invention (before adjustment)
Figure 5C:
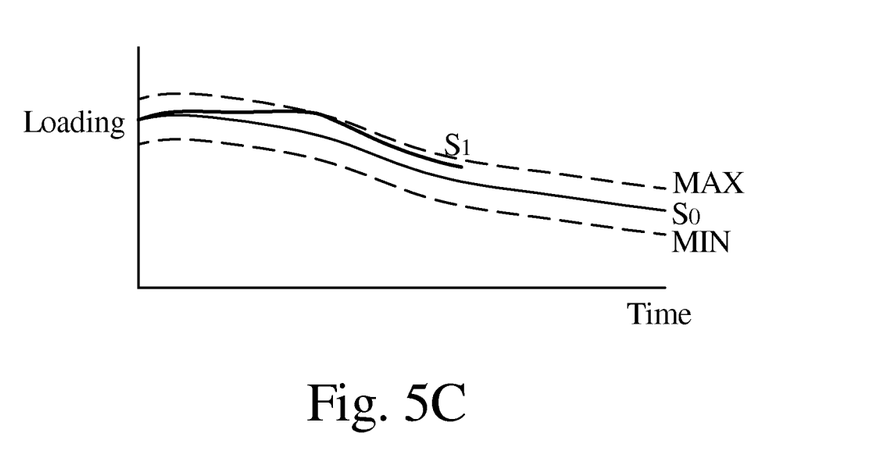
FIG. 5C is another machining loading curve chart of the strain gauge of the sensing module according to a preferred embodiment of the present invention (after adjustment).

For example, by an ideal condition or a former record of the manufacturing loading of the strain gauge, a standard curve $S_0$ of manufacturing loading is established, and a default range, a maximum value MAX and a minimum MIN, is also established. As shown in FIG. 5B, after the feedback data is analyzed by the computer module 190, if the present manufacturing loading $S_1$ is bigger than the maximum value MAX, the computer module 190 will issue a command to the automatic machining control module 160 to lower the rotating power and the feed quantity of the high-frequency vibration tool holder 200, so as to reduce the manufacturing loading in the direction. Next, as shown in FIG. 5C, now the feedback data shows that the present manufacturing loading $S_1$ is back to the default range, so that the machining stability of the high-frequency vibration tool holder 200 is improved.

Oppositely, if the present manufacturing loading $S_1$ is smaller than the minimum value MIN, the computer module 190 will issue a command to the automatic machining control module 160 to increase the rotating power and the feed quantity of the high-frequency vibration tool holder 200, so as to improve the machining efficiency of the high-frequency vibration tool holder 200.

Certainly, the high-frequency vibration tool holder 200 can select to install a plurality of the strain gauges 251 in many wanted directions, so as to sense loading situations in the many directions or an axial direction of high-frequency vibration tool holder 200, or to estimate the consuming situation of the tool holder 200. Therefore, the automatic machining control module 160 is commanded to adjust the rotating power and the feed quantity of the high-frequency vibration tool holder 200.

According to the above-mentioned design, non-contact coils transmitting electric power/signal avoids a wear phenomenon of electrodes. Additionally, because the inductive coil is arranged outside of the tool holder, the manufacturing cost of the tool holder is reduced and the convenience of changing the tool holder is increased. Moreover, the machining stability and efficiency of the high-frequency vibration tool holder is improved by a control method of sensing/feedback signals with wireless transmission.

The present invention has been described with preferred embodiments thereof and it is understood that many changes and modifications to the described embodiment can be carried out without departing from the scope and the spirit of the invention that is intended to be limited only by the appended claims.

The invention claimed is:

1. A machine tool of high-frequency vibration, comprising a main shaft structure and a high-frequency vibration tool holder, wherein the main shaft structure includes:
a main body fixed on a working side of the machine tool;
a rotating shaft rotatably disposed inside of the main body;
a tool holder chuck coaxially disposed under the rotating shaft, wherein the tool holder chuck has a pair of position keys coaxially arranged with each other, and inner side surfaces of the position keys are provided with at least one pair of first electrodes;
a stationary coil portion including a stationary ring and at least one primary coil, each of which are hollow shaped and are coaxially stacked and fixed on an upper portion of the rotating shaft, wherein the stationary ring is fixed on the main body, so that the stationary coil portion is fixed relative to the main body; and a pair of external electric wires are electrically connected to the stationary ring; and
a rotating coil portion including a rotating ring and at least one secondary coil, which are each hollow shaped and are coaxially stacked and fixed on an upper portion of the rotating shaft, wherein the secondary coil corresponds to the primary coil of the stationary coil portion; the rotating ring is fixed on the rotating shaft, so that the rotating coil portion is rotated with the rotating shaft, and the rotating coil portion is electrically connected to the at least one pair of first electrodes of the inner side surfaces of the position keys by at least one pair of inner electric wires;
wherein the high-frequency vibration tool holder comprises:

a holder shank portion disposed on an upper end of the tool holder, and configured to clamp and fix with the tool holder chuck of the main shaft structure, wherein the holder shank portion includes a pair of end keyways corresponding to the pair of position keys of the tool holder chuck; and outer sides of the end keyways are provided with at least one pair of second electrodes corresponding and contacting to the at least one pair of first electrodes of the tool holder chuck;

a receiving portion disposed on a middle portion of the tool holder, wherein a high-frequency vibration module is disposed inside the receiving portion, and is electrically connected to the at least one pair of second electrodes; and a tool chuck disposed on a lower portion of the tool holder, and configured to clamp and downwardly fix a cutting tool;

wherein the machine tool further comprises an automatic machining control module and a high-frequency control module; the automatic machining control module controls and rotates the rotating shaft, so as to cause the cutting tool under the tool holder to rotate so as to process a cutting operation; the high-frequency control module controls an electric power/signal to pass through the at least one pair of external electric wires to the stationary ring of the stationary coil portion, then the electric power/signal is transmitted to the at least one primary coil, and the at least one secondary coil of the rotating coil portion is induced to generate an electric power/signal, then the electric power/signal passes through the rotating ring, and then passes through the at least one pair of inner electric wires to be transmitted to the at least one pair of first electrodes of the tool holder chuck, then the electric power/signal is transmitted to the at least one pair of second electrodes of the holder shank portion, and finally the electric power/signal is transmitted to the high-frequency vibration module to provide the cutting tool with high-frequency vibration.

2. The machine tool according to claim 1, wherein the pair of first electrodes are contact type spring electrodes; and the pair of second electrodes include conducting sheets in an inner ring thereof and insulating sheets in a periphery thereof.

3. The machine tool according to claim 1, wherein the high-frequency vibration module is selected from a group of a piezoelectric actuator, a voice coil actuator, and a magnetic actuator.

4. The machine tool according to claim 1, wherein the number of the primary coils is two and that of the secondary coils is correspondingly two, wherein one set of the primary coil and the secondary coil is configured to transmit electric power and carrier wave signals, and the other set of the primary coil and the secondary coil is only configured to transmit carrier wave signals.

5. The machine tool according to claim 1, wherein the machine tool further comprises a wireless signal receiving module and a computer module; and the high-frequency vibration tool holder further comprises a sensing module and a wireless signal transmitting module; the sensing module is configured to transmit at least one sensing data to the wireless signal receiving module by the wireless signal transmitting module, and after the sensing data is analyzed and computed by the computer module, the computer module transmits the analyzed result to be a control command outputting to the automatic machining control module and the high-frequency control module.

6. The machine tool according to claim 5, wherein the sensing module includes a strain gauge, and the sensing data includes an internal stress data of the high-frequency vibration tool holder sensed by the strain gauge.

7. The machine tool according to claim 5, wherein the sensing module includes a thermometer, and the sensing data includes a temperature data of the high-frequency vibration tool holder sensed by the thermometer.

* * * * *